(12) United States Patent
McCready

(10) Patent No.: US 8,535,045 B2
(45) Date of Patent: Sep. 17, 2013

(54) METHOD OF PRODUCING A MOLDED ARTICLE USING A DEFORMABLE CAVITY INSERT AND DEFORMABLE CAVITY INSERT FOR A MOLDING SYSTEM

(75) Inventor: Derek Robertson McCready, Mississauga (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 71 days.

(21) Appl. No.: 13/258,051

(22) PCT Filed: Apr. 8, 2010

(86) PCT No.: PCT/CA2010/000495
§ 371 (c)(1),
(2), (4) Date: Sep. 21, 2011

(87) PCT Pub. No.: WO2010/121349
PCT Pub. Date: Oct. 28, 2010

(65) Prior Publication Data
US 2012/0025423 A1 Feb. 2, 2012

Related U.S. Application Data

(60) Provisional application No. 61/172,280, filed on Apr. 24, 2009.

(51) Int. Cl.
*B29C 45/17* (2006.01)
(52) U.S. Cl.
USPC ........ 425/526; 264/328.7; 425/528; 425/529; 425/533
(58) Field of Classification Search
USPC .................. 425/526, 528, 529, 533, 547, 548
See application file for complete search history.

(56) References Cited

U.S. PATENT DOCUMENTS

| | | | | |
|---|---|---|---|---|
| 4,315,888 | A | * | 2/1982 | Hafele ........................... 425/526 |
| 4,522,778 | A | | 6/1985 | Baciu et al. |
| 5,439,371 | A | | 8/1995 | Sawaya |
| 5,662,856 | A | | 9/1997 | Wunderlich |
| 7,293,981 | B2 | | 11/2007 | Niewels |
| 2006/0131788 | A1 | | 6/2006 | Takigawa |
| 2008/0026239 | A1 | | 1/2008 | Balboni et al. |

FOREIGN PATENT DOCUMENTS

| | | |
|---|---|---|
| CA | 2406915 A1 | 11/2001 |
| EP | 0369009 A1 | 5/1990 |
| EP | 0244783 B1 | 2/1991 |
| EP | 0593308 A1 | 4/1994 |
| EP | 0597108 A1 | 5/1994 |
| EP | 0425060 B1 | 8/1995 |
| EP | 1343621 B1 | 8/2005 |
| WO | 9825751 A1 | 6/1998 |
| WO | 2007039766 A1 | 4/2007 |

* cited by examiner

Primary Examiner — Tim Heitbrink
(74) Attorney, Agent, or Firm — Husky Intellectual Property Services

(57) ABSTRACT

According to embodiments of the present invention, there is provided a cavity insert for a molding system, the cavity insert having a deformable portion. More specifically, A cavity insert (106) is provided, the cavity insert (106) is for a molding stack (102) for use in an injection mold, the cavity insert (106). The cavity insert (106) comprises a body (122) configured to be received, in use, within a cavity plate (104) of the injection mold; the body (122) defining: a cavity molding surface (124) along an inner portion thereof; a circumferentially deformable portion (123); and an actuator interface (134) configured to cooperate, in use, with a complementary actuating interface (136) that is defined on a compression member (138) to generate a compressive force that selectively elastically deforms the circumferentially deformable portion (123).

16 Claims, 6 Drawing Sheets

METHOD OF PRODUCING A MOLDED ARTICLE USING A DEFORMABLE CAVITY INSERT AND DEFORMABLE CAVITY INSERT FOR A MOLDING SYSTEM

FIELD OF THE INVENTION

The present invention generally relates to, but is not limited to, molding systems, and more specifically the present invention relates to, but is not limited to, a cavity insert for a molding system, the cavity insert having a deformable portion.

BACKGROUND OF THE INVENTION

Molding is a process by virtue of which a molded article can be formed from molding material (such as Polyethylene Teraphalate (PET), Polypropylene (PP) and the like) by using a molding system. Various molded articles can be formed by using the molding process, such as an injection molding process. One example of a molded article that can be formed, for example, from PET material is a preform that is capable of being subsequently blown into a beverage container, such as, a bottle and the like.

As an illustration, injection molding of PET material involves heating the PET material (ex. PET pellets, etc.) to a homogeneous molten state and injecting, under pressure, the so-melted PET material into a molding cavity defined, at least in part, by a female cavity piece and a male core piece mounted respectively on a cavity plate and a core plate of the mold. The cavity plate and the core plate are urged together and are held together by clamp force, the clamp force being sufficient enough to keep the cavity and the core pieces together against the pressure of the injected PET material. The molding cavity has a shape that substantially corresponds to a final cold-state shape of the molded article to be molded. The so-injected PET material is then cooled to a temperature sufficient to enable ejection of the so-formed molded article from the mold. When cooled, the molded article shrinks inside of the molding cavity and, as such, when the cavity and core plates are urged apart, the molded article tends to remain associated with the core piece. Accordingly, by urging the core plate away from the cavity plate, the molded article can be demolded, i.e. ejected off of the core piece. Ejection structures are known to assist in removing the molded articles from the core halves. Examples of the ejection structures include stripper plates, ejector pins, etc.

One consideration for economic operation of such an injection molding system is minimizing of what is known as "cycle time", i.e. duration of time between initiation of injection of a first molded article and initiation of injection of a second molded article, the second molded article being produced during a subsequent molding cycle. Several solutions have been proposed in the art to decrease the cycle time, some of such solutions including (i) conformal cooling for in-mold cooling, whereby cooling channels are configured to closely conform to the shape of the molded article, (ii) post-mold cooling in auxiliary post-mold cooling devices and the like.

U.S. patent application bearing publication number 2008/0026239 A1 published on Jan. 31, 2008 to Baboni et al. discloses a preform that is formed by an upper neck which maintains unchanged its form in the final object and a hollow body, joined to the neck. The method foresees the insertion, within a matrix cavity, of a metered body of polymeric material whose mass is metered according to a reference value, and the subsequent pressure insertion of a punch within the matrix cavity until it closes the mold's molding chamber, the punch conferring the shape to the inner surface of the preform and the matrix having an inner surface which confers the shape to the outer surface of the preform. According to the invention, in the molding of the preform, the error of the mass of the metered body with respect to the reference value is distributed in the hollow body, which undergoes a subsequent hot deformation until it achieves the final shape. In the mold, the matrix comprises at least one deformable wall (31) whose inner surface defines at least part of the inner surface of the matrix part intended to give form to the hollow body of the preform, said deformable wall (31) having, at least in part, a relatively thin thickness which permits it to be elastically deformed under the pressure of the polymeric material in the final preform molding step, thereby varying the thickness of the hollow body.

U.S. patent application bearing publication number 2006/0131788 A1 published on Jun. 22, 2006 to Takigawa teaches a process whereby before completion of a mold closing step of a mold apparatus, a movable member of one mold is pressed against the other mold, the movable member partially defining a cavity of the mold apparatus; charging a molding material into the cavity of the mold apparatus is started; and after completion of the mold closing step, a mold clamping step of the mold apparatus is performed so as to produce a molded product. The movable member, which partially constitutes a mold, is operated in the mold closing step so as to prevent leakage, through a clearance between parting faces, of a molding material which has begun to be charged into a cavity of the mold before completion of the mold closing step, whereby, even when the mold has a simple structure using no special component members, a molded product having a shape resembling that of a three-dimensional, deep-bottomed, concave container having a thin side wall can be produced in short time.

U.S. Pat. No. 5,439,371 issued to Sawaya on Aug. 8, 1995 teaches a locally pressurizing type injection molding machine that includes a stationary die and a movable die, so that a molded product can be formed by charging a resin into a cavity defined between the dies. A pressurizing pin extends through the movable die and has its tip end facing at least one of a resin passage and the cavity. A pressurizing cylinder is disposed at the rear of the pressurizing pin to move the pressurizing pin through the pressurizing rod. Therefore, the resin charged in the cavity can be pressurized by advancing the pressurizing pin into a resin passage, for example, a gate, the cavity or the like and hence, it is possible not only to provide an extremely thin molded product, but also to prevent the generation of a sink mark. The area occupied by the movable platen can be reduced by disposing the pressurizing rod and ejector rod coaxially.

U.S. Pat. No. 7,293,981 B2 issued to Niewels on Nov. 13, 2007 discloses a method and apparatus for compressing melt and/or compensating for melt shrinkage in an injection mold. The apparatus includes a cavity mold portion adjacent a cavity plate, a core mold portion adjacent a core plate, a mold cavity formed between the mold portions, and at least one piezoceramic actuator disposed between either or both of the core plate and the core mold portion and the cavity plate and the cavity mold portion. A controller may be connected to the at least one piezoceramic actuator to activate it, thereby causing the mold cavity volume to decrease, compressing the melt.

U.S. Pat. No. 5,662,856 issued to Wunderlich on Sep. 2, 1997 teaches a system whereby hollow plastic articles are produced by a method wherein molten material is first conveyed at low pressure via a telescoping nozzle, across compensating rods in the melt passages and individually circumferential flow passages of common primary distribution spools into transfer reservoirs. Upon completion of the controlled filling phase, primary and secondary distribution spools are shifted, the mold manifold assembly with the transfer housing together with the mold cavity bottoms and outside wall-forming sleeves are drawn in unison against stationary displacement plugs which transfer the molten material from the transfer reservoirs around the fixed-position core pin tips and into corresponding mold cavities. After completion of the cavity filling phase, the common secondary distribution spools, located close to the mold cavity bottom gates, are shifted laterally such that their land areas shut off the external melt streams. The manifold assembly, together with the now sealed cavity bottoms and outside wall-forming sleeves, move toward the fixed position core pins, whereby the molten material flowing in the same direction is condensed into the final shape of the hollow plastic article. Upon solidification, the mold is opened and the molded hollow articles are rotated or shuttled on the cooling core pins in a vertical or horizontal plane outside the molding machine clamp to subsequent cooling and ejection stations. During the hollow plastic article condensing phase, the primary distribution spools are shifted laterally again to open the passages from the plasticizer to refill simultaneously the individual transfer reservoirs with molten material.

PCT patent application bearing a publication number 2007/039766 A1 published on Apr. 12, 2007 to Clarke teaches a mould for mounting between the relatively movable platens of an injection moulding press for injection impact compression moulding of an article. The mould comprises a cavity plate (18) formed with a depression (40), a core plate (12) having a projecting core (46) at least part of the outer surface of which is cylindrical and a closure plate (14) movable relative to the core plate (12) and the cavity plate (18) and having a surface in sealing contact with the cylindrical outer surface of the core (46). A locking mechanism (70, 72) is provided to lock the closure plate (14) relative to the cavity plate (18) while permitting the core plate (12) to move relative to the cavity plate (18).

SUMMARY OF THE INVENTION

According to a first broad aspect of the present invention, there is provided a cavity insert of a molding stack for use in an injection mold. The cavity insert comprises a body configured to be received, in use, within a cavity plate of the injection mold; the body defining: a cavity molding surface along an inner portion thereof; a circumferentially deformable portion; and an actuator interface configured to cooperate, in use, with a complementary actuating interface that is defined on a compression member to generate a compressive force that selectively elastically deforms the circumferentially deformable portion.

According to a second broad aspect of the present invention, there is provided a method of producing a molded article, the method executed in a cavity insert having a circumferentially deformable portion. The method comprises injecting molding material into a molding cavity defined at least partially by the cavity insert, having a first volume-state, to form the molded article; actuating the molding cavity from the first volume-state to a second volume-state, the second volume-state being smaller than the first volume-state, by actuating the circumferentially deformable portion to change the cavity insert to a fully collapsed configuration; subjecting the molded article to in-mold cooling in the second volume-state.

These and other aspects and features of non-limiting embodiments of the present invention will now become apparent to those skilled in the art upon review of the following description of specific non-limiting embodiments of the invention in conjunction with the accompanying drawings.

DESCRIPTION OF THE DRAWINGS

A better understanding of the embodiments of the present invention (including alternatives and/or variations thereof) may be obtained with reference to the detailed description of the embodiments along with the following drawings, in which.

The drawings are not necessarily to scale and are may be illustrated by phantom lines, diagrammatic representations and fragmentary views. In certain instances, details that are not necessary for an understanding of the embodiments or that render other details difficult to perceive may have been omitted.

DETAILED DESCRIPTION OF EMBODIMENTS

Inventors have developed embodiments of the present invention based on inventor's appreciation of certain limitations of the current prior art molding systems, whereby further improvements to the cycle time may be limited by considerations of quality of the molded article, and more specifically, the gate quality. More specifically, it is generally known that the gate area tends to be associated with elevated temperatures compared to other parts of the molded article, as the gate area is a portion of the molded article that is fills last with the molding material. Additionally, as the packing function is executed, even more hot material is injected into the gate area to counteract shrinkage of the molding material as it cools, which further exacerbates the cooling problem and requires even more prolonged cooling to get the gate area of the preform to an appropriate ejection temperature.

Embodiments of the present invention have been developed based on the inventor's appreciation that it may be desirable, in a quest to further shorten the cycle time, to overlap certain molding and non-molding operations within the molding cycle. Inventors further believe that they have identified certain problems with achieving such a goal, some of which may not have been appreciated by those of skill in the art hereforthto. For example, inventors have appreciated that there exists a problem with state of the art solutions if one wanted to overlap a portion of the in-mold cooling step (post-packing) with performing the shutter out function (i.e. unlocking of the mold locking mechanism). One of the issues associated with this overlap is the fact that even during post-packing cooling, the residual in-mold pressure in the molding cavity would be sufficiently high to blow open the mold halves, if shutter out function was performed too early (i.e. when the molded article has not shrunk enough to dissipate the residual pressure).

Figure 1:
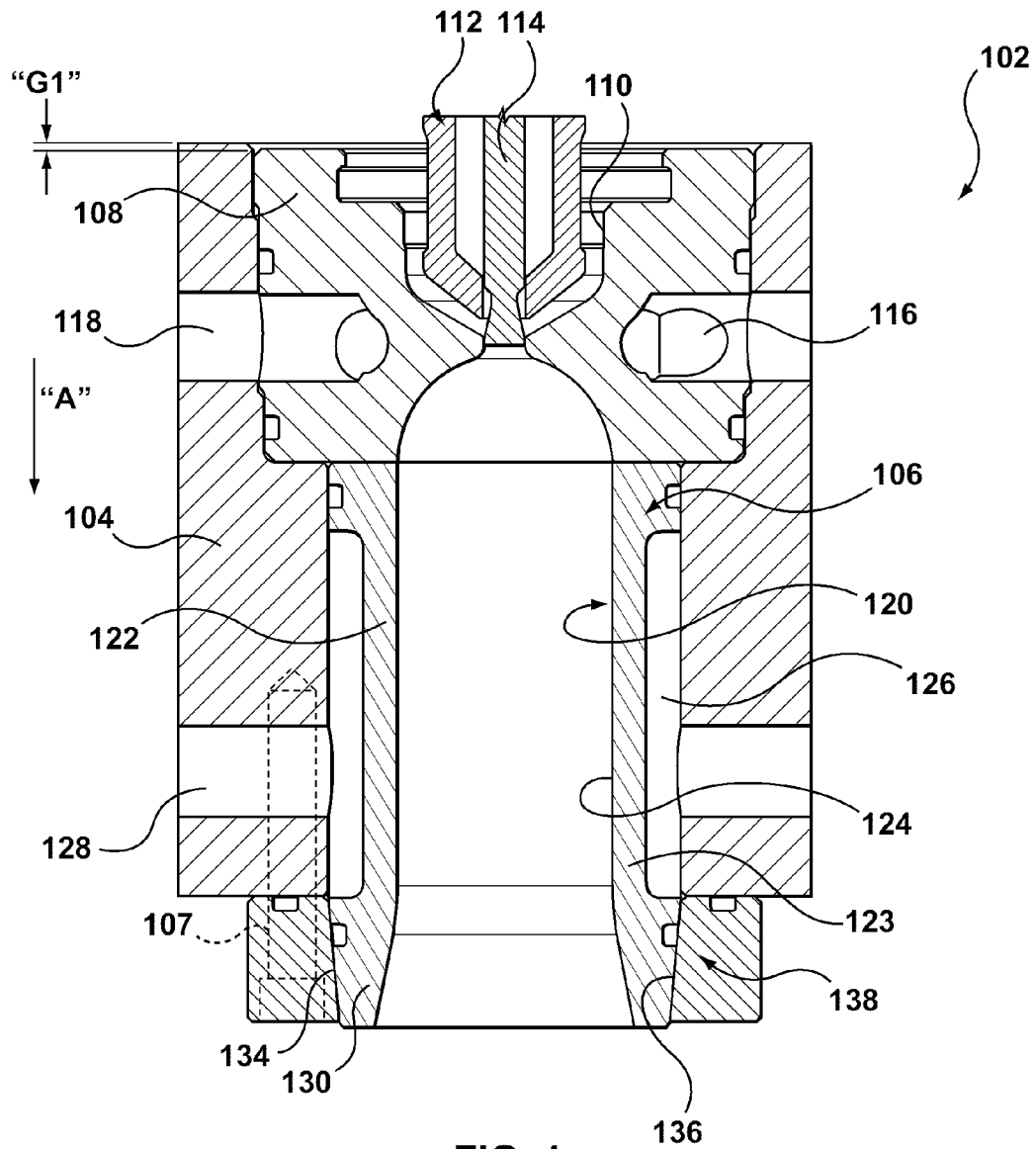
FIG. 1 depicts a sectional view taken along a portion of a molding stack housing a cavity insert implemented according to a non-limiting embodiment of the present invention, the molding stack being depicted in a mold open configuration.

With reference to FIG. 1, depicted is a molding stack 102, implemented in accordance with a non-limiting embodiment of the present invention. The molding stack 102 includes a cavity plate 104, which is implemented substantially in a known manner. As is known to those skilled in the art, the cavity plate 104 can be coupled, in use, to a stationary platen (not depicted) of a molding machine (not depicted), but can also be coupled to a moving platen (not depicted) of the molding machine (not depicted). The cavity plate 104 is configured to house one or more cavity inserts, one instance of which, a cavity insert 106 is depicted in FIG. 1, the cavity insert 106 being implemented in accordance with non-limiting embodiments of the present invention. Construction of the cavity insert 106 will be described in more detail herein below.

The cavity plate 104 is further configured to house a gate insert 108. The gate insert 108 can be implemented in accordance with known techniques and, as such, only a cursory description of this known component will be provided. The gate insert 108 is configured to provide a receptacle 110 for a nozzle assembly 112 of a hot runner (not depicted). Even though not depicted, the nozzle assembly 112 includes inter alia a valve stem 114, which is depicted for the sake of schematically illustrating its position during various portions of the molding cycle. The gate insert 108 further includes a gate insert cooling circuit 116, which cooperates with a first cavity plate cooling circuit 118 for circulating cooling fluid (not depicted) through the gate insert 108 for affecting a cooling function during certain portions of the molding cycle, as is known to those of skill in the art.

The cavity insert 106 and the gate insert 108 are configured to define a portion of a molding cavity 120. Within the example being presented herein, the molding cavity 120 is for producing a preform (not depicted) that is configured to be blow-molded into a final shape container (not depicted), such as, for example, a bottle for a drink or the like. It is noted that the exact shape of the molding cavity 120 is not limited and other configurations can be utilized in alternative embodiments of the present invention. For the sake of completeness, it is noted that the portion of the molding cavity 120 defined by the cavity insert 106 and the gate insert 108 is the external skin of the preform (not depicted) to be molded.

It is noted that within this implementation, the cavity insert 106 and the gate insert 108 are configured in a floating arrangement within the cavity plate 104. For the avoidance of doubt, the floating arrangement within the context of the instantly presented embodiments is meant to denote the cavity insert 106 and the gate insert 108 being configured for slidable displacement within the cavity plate 104 in at least a direction generally parallel to the axis of machine operation (i.e. mold open and close direction), resulting in definition of various gaps as discussed herein. Also, as is known in the art, proper sealing members are provided (such as, for example, O-rings), which are not depicted for the sake of simplicity of illustration.

Now, turning our attention to the more particular discussion of the structure of the cavity insert 106. The cavity insert 106 comprises a body 122. The body 122 defines a cavity molding surface 124 (or, in other words, the cavity molding surface 124 can be said to be defined along an inner portion of the body 122), which is configured to define a portion of the aforementioned molding cavity 120. The body 122 also includes cavity cooling circuit 126, which cooperates with a second cavity plate cooling circuit 128 for circulating cooling fluid (not depicted) through the cavity insert 106 for affecting a cooling function during certain portions of the molding cycle, as is known to those of skill in the art.

Along at least a portion of the body 122, there is provided a circumferentially deformable portion 123, which is configured to be circumferentially elastically deformed, as will be described in greater detail herein below. As is known to those of skill in the art, the body 122 can be produced from a suitable material, such as for example 420 stainless steel. In some embodiments of the present invention, the circumferentially deformable portion 123 can be produced from 420 stainless steel. In some embodiments and depending on the degree of circumferential and elastic deformation desired, the circumferentially deformable portion 123 can be associated with the same thickness as the rest of the body 122 or, alternatively, can be associated with a thickness that is smaller than that of the rest of the body 122. In alternative embodiment, the whole of the body 122 can be associated with a smaller thickness compared to prior art designs. In alternative non-limiting embodiments of the present invention, the circumferentially deformable portion 123 can be manufactured of a different material that can provide for circumferential elastic deformation. Regardless of how the circumferentially deformable portion 123 is implemented, it has to be implemented to provide structural rigidity for the injection of the molding material, while providing for circumferential deformation.

The body 122 further includes a neck defining cavity portion 130, which is configured to define a transition portion of the molded article (not depicted) to be molded and which amongst other things includes an actuator interface 134. As will be described in greater detail below, the actuator interface 134 is configured to cooperate with an actuating interface 136 defined on a compression member 138 to generate a compressive force that selectively elastically deforms the circumferentially deformable portion 123. It is noted that the compression member 138 is coupled to the cavity insert plate 104, by means for example, of a suitable fastener (not depicted) received through a fastener receptacle 107 defined in the compression member 138 and the cavity insert plate 104. Even though in the presently illustrated embodiment, the compression member 138 is implemented as a ring structure fastened to the cavity plate 104, in additional embodiments of the present invention, the compression member 138 can be implemented as a ring reinforced by a plate or in yet further embodiments, just as a plate with an aperture (or one or more apertures) defined therethrough.

For the avoidance of doubt, by the term "elastically deforms" inventors mean that the change in shape is self-reversing after the actuating force is removed, so that the circumferentially deformable portion 123 returns to its original shape. By the term "selectively" inventors mean controllably, i.e. responsive to actuation of the actuating interface 136, as will be described in greater detail herein below.

It is noted that even though in the embodiment being discussed herein, the circumferentially deformable portion 123 is located substantially proximate with the actuator interface 134 that in turn is positioned proximate to the molding structure associated with the neck finish of the molded article to be molded (i.e. the neck defining cavity portion 130), in alternative embodiment of the present invention, the circumferentially deformable portion 123 can be located remote from the molding structure associated with the neck finish of the preform to be molded. In yet further non-limiting embodiments of the present invention, the circumferentially deformable portion 123 can be configured to extend substantially along a portion or the whole length of the body 122. Some of these alternative embodiments will be illustrated in greater detail herein below.

More specifically, within the currently illustrated embodiment, the actuator interface 134 and the actuating interface 136 are implemented as complementary tapers (i.e. complementary a first taper and a second taper). Within the illustration of FIG. 1, the molding stack 102 is depicted in a mold open configuration (thus no depiction of a core portion of the molding stack 102, which will be described later) with the valve stem 114 being in a closed configuration. Within this configuration, the circumferentially deformable portion 123 can be said to be in a "partially collapsed configuration".

As can be seen within the illustration, the gate insert 108, which is allowed to axially float, under the action of the residual pressure within the nozzle assembly 112, the gate insert 108 is pushed in a direction "A", whereby gap "G1" is manifested. This, in turn, pushes the cavity insert 106 to slide within the cavity plate 104 in the direction "A", which in turn, creates taper interference between the actuator interface 134 and the actuating interface 136 that results in at least partial inward deformation of the circumferentially deformable portion 123.

Figure 2:
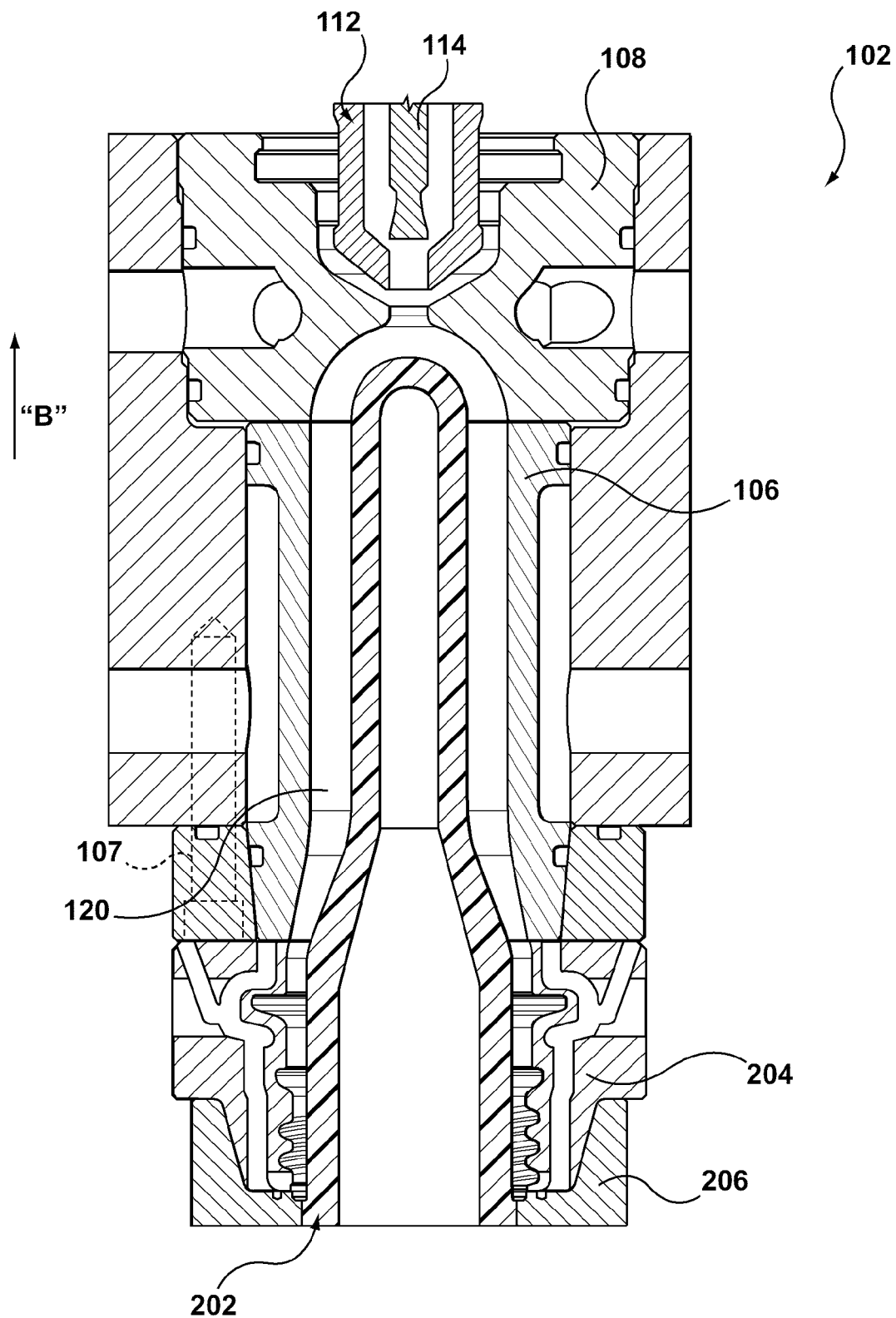
FIG. 2 depicts a sectional view taken along a portion of the molding stack housing the cavity insert of FIG. 1, the molding stack being depicted in a mold closed and clamped up configuration, whereby injection of the molding material can be affected.

With reference to FIG. 2, the molding stack 102 of FIG. 1 is depicted in a mold closed and clamped up configuration. Within the illustration of FIG. 2, the valve stem 114 is depicted in an open configuration. Furthermore, within the illustration of FIG. 2, there is also depicted, as part of the molding stack 102, a portion of a core assembly 202 that is configured to define a portion of the molding cavity 120 and, more specifically, an inner skin of the preform (not depicted) to be molded.

Also provided within the molding stack 102 is a split mold insert assembly 204, also sometimes referred to in the industry as "neck rings". The split mold insert assembly 204 can be implemented in substantially known manner and, to that extent, includes two complementary halves (not separately numbered) that cooperate together to define yet another portion of the molding cavity 120 and, more specifically, an outer portion of a neck finish (not depicted) of the preform (not depicted) to be molded.

Also, visible within illustration of FIG. 2 is a portion of a lock ring 206 that is configured to attach the core assembly 202 to a core plate (not depicted), as well as provide an alignment feature to the split mold insert assembly 204 in a form of tapers (not separately numbered), as is well known in the art.

Within this configuration, the mold clamp action forces the cavity insert 106 and the gate insert 108 along a direction "B", effectively releasing taper interference between the actuator interface 134 and the actuating interface 136, which results in relaxing of the circumferentially deformable portion 123. Therefore, within the illustration of FIG. 2, the circumferentially deformable portion 123 can be said to be in a "relaxed configuration". Within the illustration of FIG. 2, molding material can be injected into the molding cavity 120.

Figure 3:
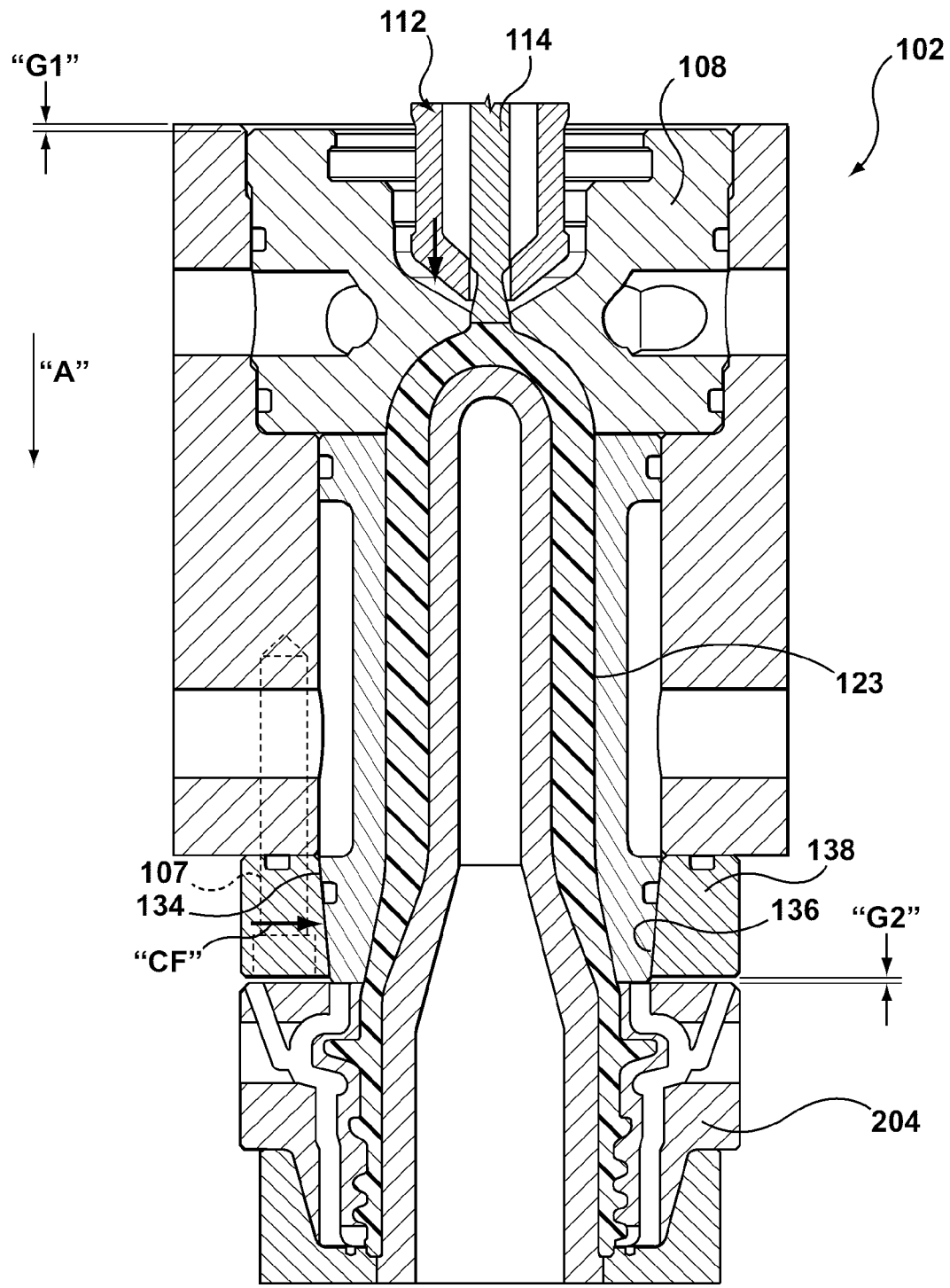
FIG. 3 depicts a sectional view taken along a portion of the molding stack housing the cavity insert of FIG. 1, the molding stack being depicted in a configuration where a holding portion of the molding cycle is implemented.

Turning now to the illustration of FIG. 3, which depicts the molding stack 102 of FIG. 2 within the mold closed and clamped up configuration with the valve stem 114 still in the closed configuration. Within this configuration, meltpressure within the nozzle assembly 112 pushes the gate insert 108 in the direction "A", whereby gap "G1" is again manifested. Within a specific implementation of these embodiments, the clamp pressure may be controllably decreased to allow the residual pressure to actuate the gate insert 108 in the direction "A". It is noted that in some embodiments of the present invention, at this stage, the melt pressure within the nozzle assembly 112 may be also changed in addition to or instead of changing the clamp pressure or, in other words, to increase the pressure to affect the movement in direction "A" discussed immediately above. This, in turn, pushes the cavity insert 106 in the direction "A", which in turn, creates taper interference between the actuator interface 134 and the actuating interface 136, which creates compressive force "CF", which in turns results in inward deformation of the circumferentially deformable portion 123. It is noted that due to this mutual displacement, a gap "G2" manifested between the compression member 138 and the split mold insert assembly 204. Therefore, within the illustration of FIG. 2, the circumferentially deformable portion 123 can be said to be in a "fully collapsed configuration", effectively decreasing the cavity volume compared, for example, to the relaxed configuration depicted in FIG. 2.

Figure 4:
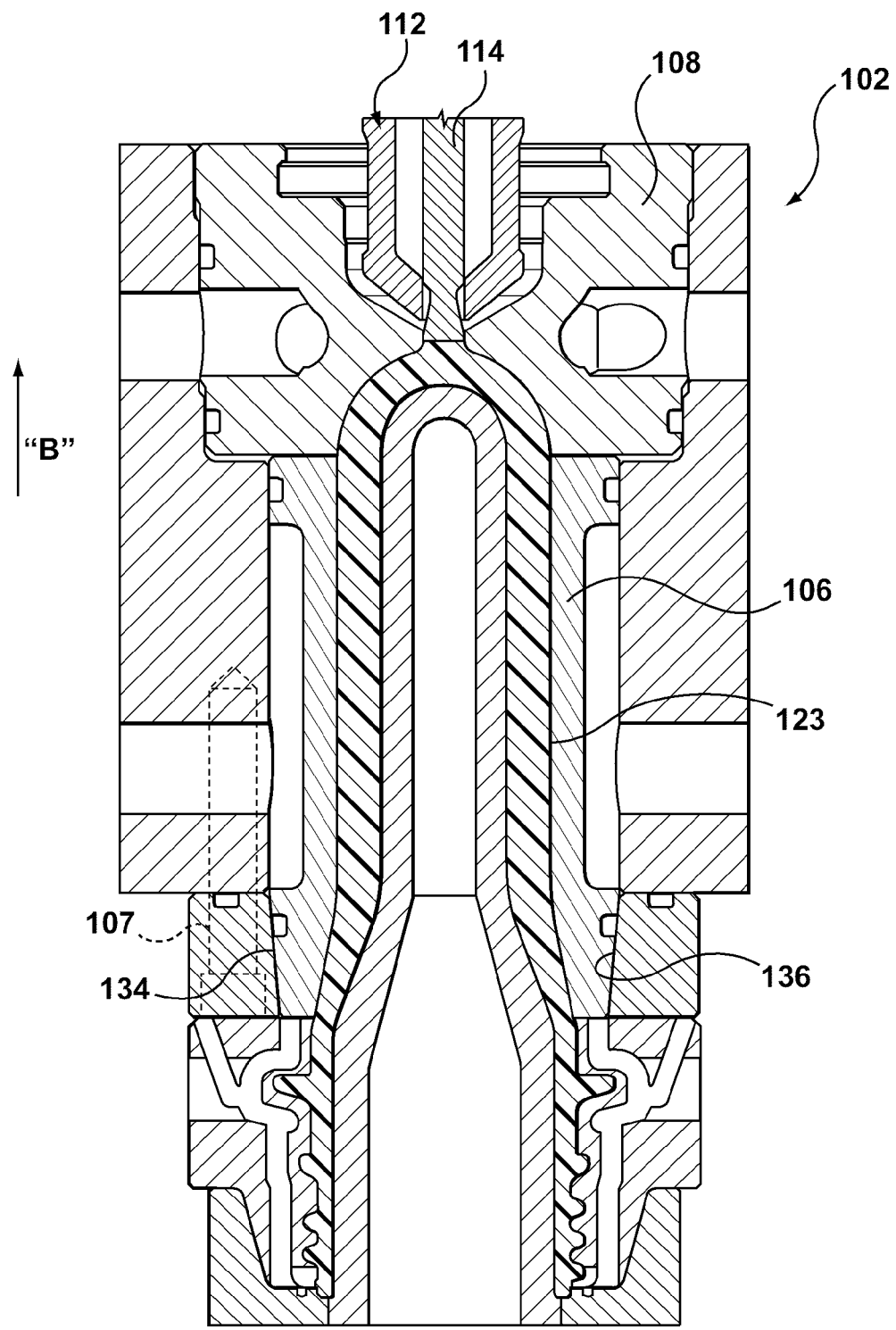
FIG. 4 depicts a sectional view taken along a portion of the molding stack housing the cavity insert of FIG. 1, the molding stack being depicted in a configuration where an in-mold pressure decompression is performed.

Turning now to the illustration of FIG. 4, the molding stack 102 of FIG. 3 is depicted in the mold closed and clamped up configuration with the valve stem 114 still in the closed configuration, however the clamp force (which at this point can be increased by suitable means to counteract the action of the residual pressure in the nozzle assembly 112 described in association with FIG. 3), forces the cavity insert 106 and the gate insert 108 along the direction "B", effectively releasing taper interference between the actuator interface 134 and the actuating interface 136, which results in relaxing of the circumferentially deformable portion 123. Therefore, within the illustration of FIG. 3, the circumferentially deformable portion 123 can be said to be in a "relaxed configuration", effectively releasing pressure within the molding cavity 120, as will be described in greater detail herein below.

Given the architecture of FIGS. 1-4, a molding cycle will now be described in greater detail, highlighting one or more technical effects of the structures described above.

Mold Open

As is shown in FIG. 1, the molding stack 102 is in the mold open configuration at the end of a previous mold cycle. Within this configuration, the circumferentially deformable portion 123 is in a "partially collapsed configuration"

Mold close and Inject

As is shown in FIG. 2, the molding stack 102 is in a mold closed and clamped up configuration. The circumferentially deformable portion 123 is in a "relaxed configuration". At this point the molding material can be injected into the molding cavity 120, in a manner known in the art. It is noted that the molding material is being injected into what can be thought of as a first volume-state of the molding cavity 120.

In-Mold Cooling/Shrinkage Compensation

Within the illustration of FIG. 3, the operation of in-mold cooling is effectively carried out. It is noted that in this configuration, the circumferentially deformable portion 123 is actuated into the "fully collapsed configuration", effectively compensating for any shrinkages of the preform being molded. It is noted that this compensation for the shrinkage is executed with no additional molding material being added to the molding cavity 120, as the valve stem 114 is in the closed configuration. It is noted that the preform is being subjected to in-mold cooling in what can be thought of as a second volume-state of the molding cavity 120 (the second volume-state being smaller that the first volume-state).

In-Mold Pressure Relief

Within the illustration of FIG. 4, the circumferentially deformable portion 123 is actuated into the "relaxed configuration", effectively relieving in-mold pressure in the molding cavity 120. In other words, the volume of the molding cavity 120 returns to its "original" volume, i.e. the volume similar to that of FIG. 2. In other words, the volume of the molding cavity 120 returns to the first mold-volume state. It is noted that at this point, the mold pressure within the molding cavity 120 is effectively relieved allowing to execute the shutter out function earlier compared to prior art methods and systems.

To summarize, what has been described is a method of producing a molded article, the method executed, for example, in the cavity insert 106 that includes a circumferentially deformable portion 123, the method including:

(i) injecting molding material into a molding cavity defined at least partially by the cavity insert 106, having a first volume-state, to form the molded article;

(ii) actuating the molding cavity from the first volume-state to a second volume-state, the second volume-state being smaller than the first volume-state, by actuating the circumferentially deformable portion 123 to change the cavity insert 106 to a fully collapsed configuration;

(iii) subjecting the molded article to in-mold cooling in the second volume-state.

Figure 5:
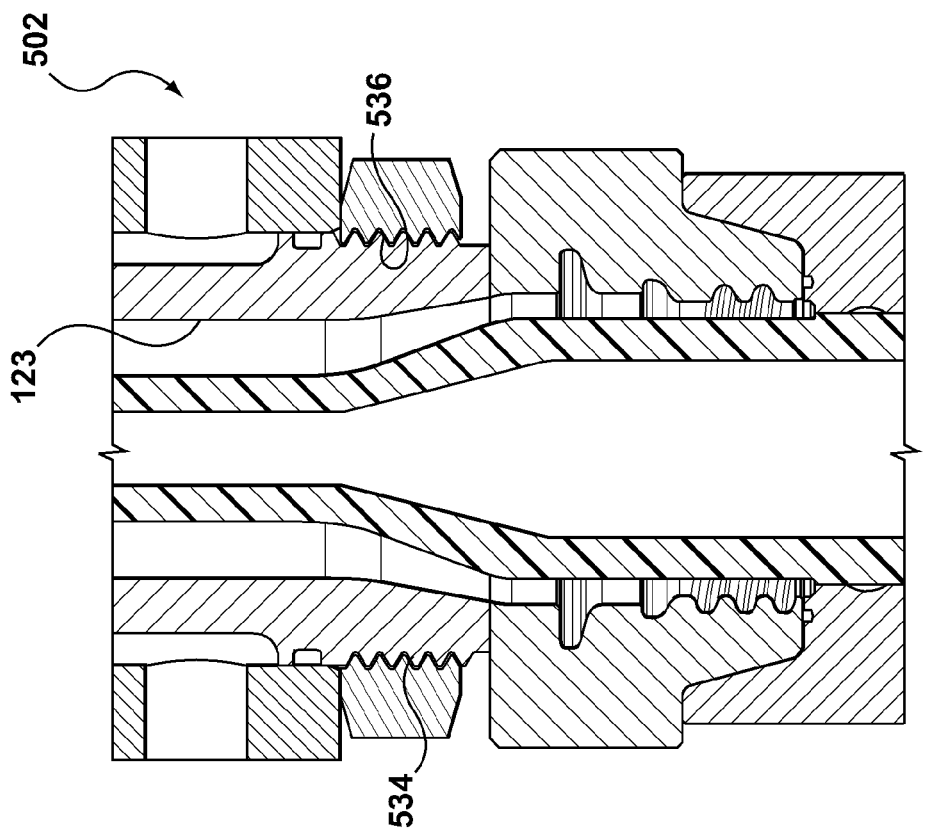
FIG. 5 depicts a partial sectional view of a mold stack showing another non-limiting embodiment of the present invention for implementing an actuator interface and an actuating interface.

It is noted that the implementation of the actuator interface 134 and the actuating interface 136 described above are just examples of possible implementations. With reference to FIG. 5 a description of another non-limiting embodiment of the present invention will now be presented. A portion of a mold stack 502 is depicted, which can be implemented in a substantially similar manner to the molding stack 102, other than for the specific differences that will be described momentarily.

Figure 6:
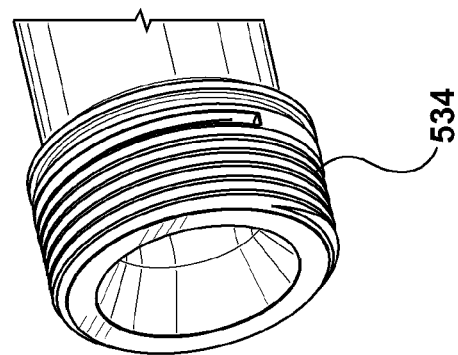
FIG. 6 depicts a partial perspective view of the actuator interface and the actuating interface of FIG. 5 in greater detail.

Within the illustration of FIG. 5, there is provided an actuator interface 534 and an actuating interface 536. The function of the actuator interface 534 and the actuating interface 536 is substantially similar to the function of the actuator interface 134 and the actuating interface 136 described above, however the structural implementation is different. Within this illustration as is better show in FIG. 6, the actuator interface 534 comprises a tapered thread and the actuating interface 136 comprises a complementary thread on a geared actuator. In some embodiments of the present invention, the complementary thread can be a straight thread. In alternative embodiments, the complementary thread can be a tapered thread. Upon rotation of the geared actuator in a first and a second direction, the complementary straight thread will engage or disengage the tapered thread, respectively, which will actuate the circumferentially deformable portion 123 into the collapsed configuration or the relaxed configuration, respectively. It is noted that the geared actuator can be rotated in a known manner, such as by using a gear rack or other suitable means.

Figure 7:
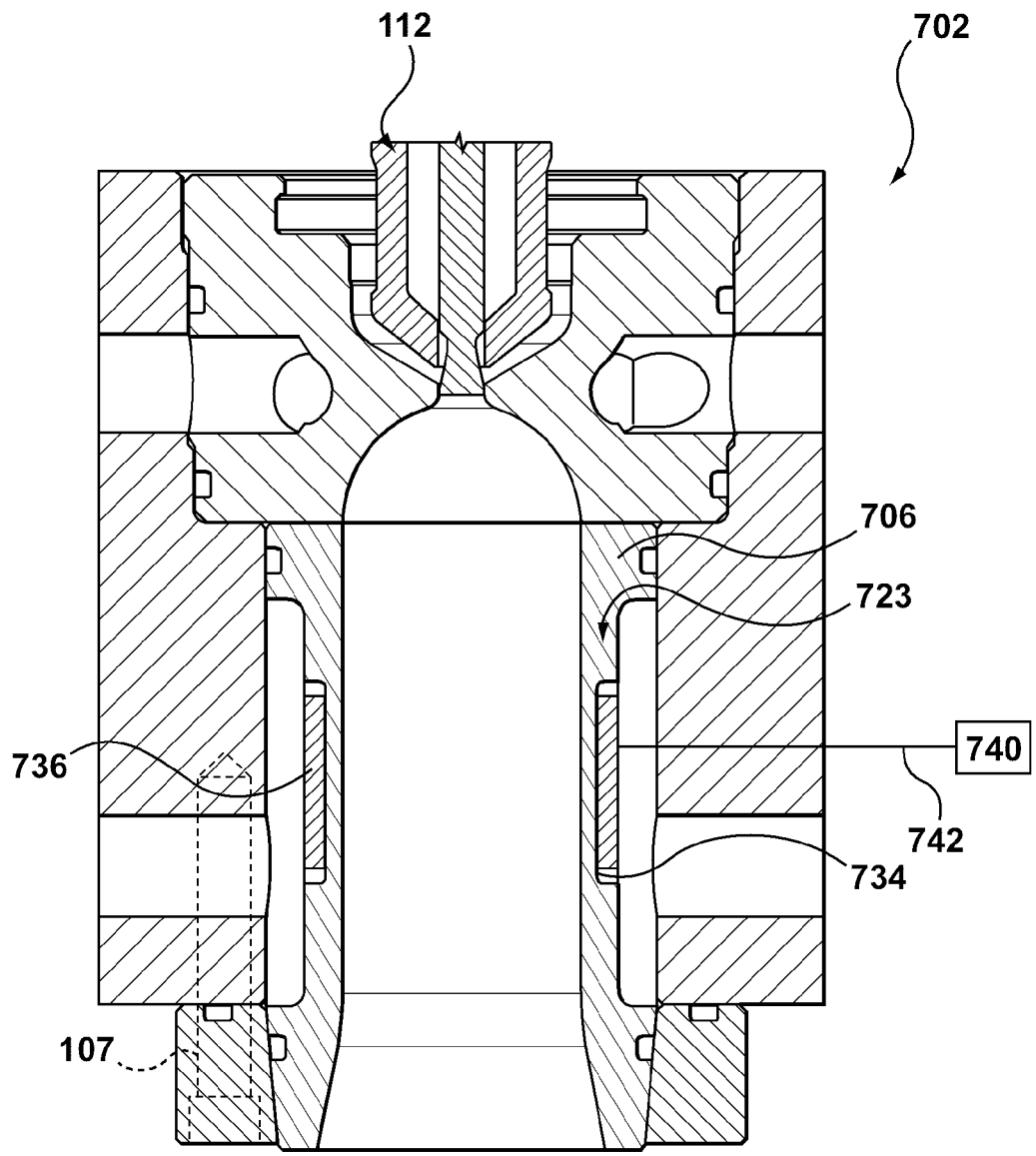
FIG. 7 depicts a portion of a mold stack, with a cavity insert, depicting an actuator interface and an actuating interface implemented according to yet another non-limiting embodiment of the present invention.

Inventors believe that they can further adapt the non-limiting implementations for the actuator interface 134 and the actuating interface 136. For example, in yet further non-limiting embodiments of the present invention, the actuator interface 134 can be implemented as a receptacle defined on the cavity insert 106 and the actuating interface 136 can be defined as an active material actuator, not depicted but well known to those of skill in the art. An example of the active material actuator is a piezo-electric actuator. Actuation of the active material actuator would affect actuation of the circumferentially deformable portion 123 into the collapsed configuration or the relaxed configuration, respectively. An example non-limiting implementation of this embodiment is depicted in FIG. 7. FIG. 7 depicts a portion of a mold stack 702, which can be implemented in a substantially similar manner to the molding stack 102, other than for the specific differences that will be described momentarily. A cavity insert 706 is provided with a circumferentially deformable portion 723 defined along a portion of a body thereof. The circumferentially deformable portion 723 is associated with an actuator interface 734, which is implemented as a pocket within the body of the cavity insert 706. The actuator interface 734 is cooperates with an actuating interface 736, which is in this embodiment is implemented as a piezo-electric actuator, which is responsive to an actuation signal provided from a controller 740, which can be transmitted via a connection 742. The connection 742 can be implemented as a wired connection, as a wireless connection or combination thereof. Operation of such piezo-electric actuators is known in the art and will not be described here at any length.

In yet further non-limiting embodiments of the present invention, the actuator interface 134 and the actuating interface 136 can be implemented in a different form factor. For example, in yet further non-limiting embodiments of the present invention, the actuator interface 134 can be implemented as a receptacle defined on the cavity insert 106 and the actuating interface 136 can be defined as an a conduit for pressure fluid. By varying pressure within the conduit for pressure fluid, the circumferentially deformable portion can be controllably elastically deformed.

Embodiments of the present invention provide one or more technical effects over the known prior art solutions. One of the technical effects so provided is another alternative to compensate for material shrinkage without negatively impacting cooling time. More specifically, embodiments of the present invention allow to close the valve stems as soon as filling operation of the molding cycle is completed and to compensate for shrinkage by varying cavity volume by means of providing a circumferentially deformable portion on the cavity insert. Another technical effect of embodiments of the present invention allows to overlap the in-mold cooling step (after packing) with unlocking of the shutter out (unlocking of the mold locking mechanism) by providing ability to depressurize the molding cavity by increasing the volume of the molding cavity by actuating the circumferentially deformable portion on the cavity insert. This overlap of the function may assist in further reducing the molding cycle time. It should be noted that not each and every technical effect needs to be enjoyed in each and every embodiment of the present invention.

The description of the embodiments of the present inventions provides examples of the present invention, and these examples do not limit the scope of the present invention. It is to be expressly understood that the scope of the present invention is limited by the claims only. The concepts described above may be adapted for specific conditions and/or functions, and may be further extended to a variety of other applications that are within the scope of the present invention. Having thus described the embodiments of the present invention, it will be apparent that modifications and enhancements are possible without departing from the concepts as described. Therefore, what is to be protected by way of letters patent are limited only by the scope of the following claims:

The invention claimed is:

1. A cavity insert (106) of a molding stack (102) for use in an injection mold, the cavity insert (106) comprising:
 a body (122) configured to be received, in use, within a cavity plate (104) of the injection mold; the body (122) defining:
 a cavity molding surface (124) along an inner portion of said body;
 a circumferentially deformable portion (123); and
 an actuator interface (134) configured to cooperate, in use, with a complementary actuating interface (136) that is defined on a compression member (138) to generate a compressive force that selectively elastically deforms the circumferentially deformable portion (123).

2. The cavity insert of claim 1, wherein said compressive force is generated responsive to a relative repositioning between the body (122) and the compression member (138).

3. The cavity insert of claim 1, wherein said actuator interface (134) and said complementary actuating interface (136) are implemented as complementary tapers, wherein said compressive force is generated responsive to relative repositioning between the complementary tapers.

4. The cavity insert of claim 1, wherein said actuator interface (134) comprises a tapered thread and said complementary actuating interface (136) comprises a complementary thread on a geared actuator.

5. The cavity insert of claim 4, wherein said complementary thread is a straight thread.

6. The cavity insert of claim 4, wherein said complementary thread is a complementary tapered thread.

7. The cavity insert of claim 1, wherein said actuator interface (134) comprises a pocket (734) defined in the body (122) and said complementary actuating interface (136) comprises an active material actuator (723).

8. The cavity insert of claim 7, wherein said active material actuator (723) is responsive to an actuation signal from a controller (740).

9. The cavity insert of claim 1, where said circumferentially deformable portion (123) is defined along a portion of a length of the body (122).

10. The cavity insert of claim 9, where said circumferentially deformable portion (123) is defined along the whole of the length of the body (122).

11. The cavity insert of claim 1, wherein said compression member (138) comprises a ring.

12. The cavity insert of claim 1, wherein said compression member (138) comprises a plate with an aperture defined therethrough.

13. A method of producing a molded article, the method executed in a cavity insert (106) having a circumferentially deformable portion (123), the method comprising:
 injecting molding material into a molding cavity defined at least partially by the cavity insert (106), having a first volume-state, to form the molded article;
 actuating the molding cavity from the first volume-state to a second volume-state, the second volume-state being smaller than the first volume-state, by actuating the circumferentially deformable portion (123) to change the cavity insert (106) to a fully collapsed configuration;
 subjecting the molded article to in-mold cooling in the second volume-state.

14. The method of claim 13, further comprising after said subjecting and prior to ejection of the molded article:
 actuating the circumferentially deformable portion (123) to change the molding cavity to a relaxed configuration.

15. The method of claim 13, wherein said subjecting is executed with a valve stem in a closed configuration.

16. The method of claim 15, wherein said subjecting is executed substantially with no additional molding material being added to the molding cavity.

* * * * *